United States Patent
Colgrove et al.

(10) Patent No.: US 12,340,107 B2
(45) Date of Patent: Jun. 24, 2025

(54) DEDUPLICATION SELECTION AND OPTIMIZATION

(71) Applicant: PURE STORAGE, INC., Santa Clara, CA (US)

(72) Inventors: John Colgrove, Los Altos, CA (US); Ronald Karr, Palo Alto, CA (US); Ethan L. Miller, Santa Cruz, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 18/353,264

(22) Filed: Jul. 17, 2023

(65) Prior Publication Data

US 2023/0359381 A1 Nov. 9, 2023

Related U.S. Application Data

(63) Continuation of application No. 16/194,119, filed on Nov. 16, 2018, now Pat. No. 11,704,036, which is a
(Continued)

(51) Int. Cl.
*G06F 12/00* (2006.01)
*G06F 3/06* (2006.01)
(Continued)

(52) U.S. Cl.
CPC ............ *G06F 3/0641* (2013.01); *G06F 3/061* (2013.01); *G06F 3/0619* (2013.01);
(Continued)

(58) Field of Classification Search
CPC .. G06F 3/0641; G06F 16/2255; G06F 16/258; G06F 16/2365; G06F 3/061;
(Continued)

(56) References Cited

U.S. PATENT DOCUMENTS

| | | |
|---|---|---|
| 5,390,327 A | 2/1995 | Lubbers et al. |
| 5,450,581 A | 9/1995 | Bergen et al. |

(Continued)

FOREIGN PATENT DOCUMENTS

| | | |
|---|---|---|
| EP | 2164006 A2 | 3/2010 |
| EP | 2256621 A1 | 12/2010 |

(Continued)

OTHER PUBLICATIONS

Hwang et al., "RAID-x: A New Distributed Disk Array for I/O-Centric Cluster Computing", Proceedings of The Ninth International Symposium On High-performance Distributed Computing, Aug. 2000, pp. 279-286, The Ninth International Symposium on High-Performance Distributed Computing, IEEE Computer Society, Los Alamitos, CA.

(Continued)

*Primary Examiner* — Daniel D Tsui

(57) ABSTRACT

Systems and method for implementing deduplication process based on performance analyses. The system may include a processing device to determine a first performance metric associated with retrieving a second stored data block that is within a specified range of a duplicate of the first data block and a second performance metric associated with retrieving a hash value corresponding to the second stored data block. The processing device further to retrieve the second stored data block within a specified range of the duplicate of the first data block in response to the first performance metric not exceeding the second performance metric.

15 Claims, 7 Drawing Sheets

Related U.S. Application Data continuation of application No. 15/333,903, filed on Oct. 25, 2016, now Pat. No. 10,133,503.

(60) Provisional application No. 62/330,728, filed on May 2, 2016.

(51) Int. Cl.
  *G06F 12/1018* (2016.01)
  *G06F 16/22* (2019.01)
  *G06F 16/23* (2019.01)
  *G06F 16/25* (2019.01)

(52) U.S. Cl.
  CPC .......... *G06F 3/0665* (2013.01); *G06F 3/0689* (2013.01); *G06F 12/1018* (2013.01); *G06F 16/2255* (2019.01); *G06F 16/2365* (2019.01); *G06F 16/258* (2019.01)

(58) Field of Classification Search
  CPC .... G06F 3/0619; G06F 3/0665; G06F 3/0689; G06F 12/1018
  See application file for complete search history.

(56) References Cited

U.S. PATENT DOCUMENTS

| | | |
|---|---|---|
| 5,479,653 A | 12/1995 | Jones |
| 5,488,731 A | 1/1996 | Mendelsohn |
| 5,504,858 A | 4/1996 | Ellis et al. |
| 5,564,113 A | 10/1996 | Bergen et al. |
| 5,574,882 A | 11/1996 | Menon et al. |
| 5,649,093 A | 7/1997 | Hanko et al. |
| 5,883,909 A | 3/1999 | DeKoning et al. |
| 6,000,010 A | 12/1999 | Legg |
| 6,260,156 B1 | 7/2001 | Garvin et al. |
| 6,269,453 B1 | 7/2001 | Krantz |
| 6,275,898 B1 | 8/2001 | DeKoning |
| 6,453,428 B1 | 9/2002 | Stephenson |
| 6,523,087 B2 | 2/2003 | Busser |
| 6,535,417 B2 | 3/2003 | Tsuda et al. |
| 6,643,748 B1 | 11/2003 | Wieland |
| 6,725,392 B1 | 4/2004 | Frey et al. |
| 6,763,455 B2 | 7/2004 | Hall |
| 6,836,816 B2 | 12/2004 | Kendall |
| 6,985,995 B2 | 1/2006 | Holland et al. |
| 7,032,125 B2 | 4/2006 | Holt et al. |
| 7,047,358 B2 | 5/2006 | Lee et al. |
| 7,051,155 B2 | 5/2006 | Talagala et al. |
| 7,055,058 B2 | 5/2006 | Lee et al. |
| 7,065,617 B2 | 6/2006 | Wang |
| 7,069,383 B2 | 6/2006 | Yamamoto et al. |
| 7,076,606 B2 | 7/2006 | Orsley |
| 7,107,480 B1 | 9/2006 | Moshayedi et al. |
| 7,159,150 B2 | 1/2007 | Kenchammana-Hosekote et al. |
| 7,162,575 B2 | 1/2007 | Dalal et al. |
| 7,164,608 B2 | 1/2007 | Lee |
| 7,188,270 B1 | 3/2007 | Nanda et al. |
| 7,334,156 B2 | 2/2008 | Land et al. |
| 7,370,220 B1 | 5/2008 | Nguyen et al. |
| 7,386,666 B1 | 6/2008 | Beauchamp et al. |
| 7,398,285 B2 | 7/2008 | Kisley |
| 7,424,498 B1 | 9/2008 | Patterson |
| 7,424,592 B1 | 9/2008 | Karr et al. |
| 7,444,532 B2 | 10/2008 | Masuyama et al. |
| 7,480,658 B2 | 1/2009 | Heinla et al. |
| 7,484,056 B2 | 1/2009 | Madnani et al. |
| 7,484,057 B1 | 1/2009 | Madnani et al. |
| 7,484,059 B1 | 1/2009 | Ofer et al. |
| 7,536,506 B2 | 5/2009 | Ashmore et al. |
| 7,558,859 B2 | 7/2009 | Kasiolas et al. |
| 7,565,446 B2 | 7/2009 | Talagala et al. |
| 7,613,947 B1 | 11/2009 | Coatney et al. |
| 7,634,617 B2 | 12/2009 | Misra |
| 7,634,618 B2 | 12/2009 | Misra |
| 7,681,104 B1 | 3/2010 | Sim-Tang et al. |
| 7,681,105 B1 | 3/2010 | Sim-Tang et al. |
| 7,681,109 B2 | 3/2010 | Litsyn et al. |
| 7,730,257 B2 | 6/2010 | Franklin |
| 7,730,258 B1 | 6/2010 | Smith et al. |
| 7,730,274 B2 | 6/2010 | Usgaonkar |
| 7,743,276 B2 | 6/2010 | Jacobson et al. |
| 7,752,489 B2 | 7/2010 | Deenadhayalan et al. |
| 7,757,038 B2 | 7/2010 | Kitahara |
| 7,757,059 B1 | 7/2010 | Ofer et al. |
| 7,778,960 B1 | 8/2010 | Chatterjee et al. |
| 7,783,955 B2 | 8/2010 | Murin |
| 7,814,272 B2 | 10/2010 | Barrall et al. |
| 7,814,273 B2 | 10/2010 | Barrall |
| 7,818,531 B2 | 10/2010 | Barral |
| 7,827,351 B2 | 11/2010 | Suetsugu et al. |
| 7,827,439 B2 | 11/2010 | Mathew et al. |
| 7,831,768 B2 | 11/2010 | Ananthamurthy et al. |
| 7,856,583 B1 | 12/2010 | Smith |
| 7,870,105 B2 | 1/2011 | Arakawa et al. |
| 7,873,878 B2 | 1/2011 | Belluomini et al. |
| 7,885,938 B1 | 2/2011 | Greene et al. |
| 7,886,111 B2 | 2/2011 | Klemm et al. |
| 7,908,448 B1 | 3/2011 | Chatterjee et al. |
| 7,916,538 B2 | 3/2011 | Jeon et al. |
| 7,921,268 B2 | 4/2011 | Jakob |
| 7,930,499 B2 | 4/2011 | Duchesne |
| 7,941,697 B2 | 5/2011 | Mathew et al. |
| 7,958,303 B2 | 6/2011 | Shuster |
| 7,971,129 B2 | 6/2011 | Watson et al. |
| 7,975,115 B2 | 7/2011 | Wayda et al. |
| 7,984,016 B2 | 7/2011 | Kisley |
| 7,991,822 B2 | 8/2011 | Bish et al. |
| 8,006,126 B2 | 8/2011 | Deenadhayalan et al. |
| 8,010,485 B1 | 8/2011 | Chatterjee et al. |
| 8,010,829 B1 | 8/2011 | Chatterjee et al. |
| 8,020,047 B2 | 9/2011 | Courtney |
| 8,046,548 B1 | 10/2011 | Chatterjee et al. |
| 8,051,361 B2 | 11/2011 | Sim-Tang et al. |
| 8,051,362 B2 | 11/2011 | Li et al. |
| 8,074,038 B2 | 12/2011 | Lionetti et al. |
| 8,082,393 B2 | 12/2011 | Galloway et al. |
| 8,086,603 B2 | 12/2011 | Nasre et al. |
| 8,086,634 B2 | 12/2011 | Mimatsu |
| 8,086,911 B1 | 12/2011 | Taylor |
| 8,090,837 B2 | 1/2012 | Shin et al. |
| 8,108,502 B2 | 1/2012 | Tabbara et al. |
| 8,117,388 B2 | 2/2012 | Jernigan, IV |
| 8,117,521 B2 | 2/2012 | Parker et al. |
| 8,140,821 B1 | 3/2012 | Raizen et al. |
| 8,145,838 B1 | 3/2012 | Miller et al. |
| 8,145,840 B2 | 3/2012 | Koul et al. |
| 8,175,012 B2 | 5/2012 | Chu et al. |
| 8,176,360 B2 | 5/2012 | Frost et al. |
| 8,176,405 B2 | 5/2012 | Hafner et al. |
| 8,180,855 B2 | 5/2012 | Aiello et al. |
| 8,200,922 B2 | 6/2012 | McKean et al. |
| 8,209,469 B2 | 6/2012 | Carpenter et al. |
| 8,225,006 B1 | 7/2012 | Karamcheti |
| 8,239,618 B2 | 8/2012 | Kotzur et al. |
| 8,244,999 B1 | 8/2012 | Chatterjee et al. |
| 8,261,016 B1 | 9/2012 | Goel |
| 8,271,455 B2 | 9/2012 | Kesselman |
| 8,285,686 B2 | 10/2012 | Kesselman |
| 8,305,811 B2 | 11/2012 | Jeon |
| 8,315,999 B2 | 11/2012 | Chatley et al. |
| 8,327,080 B1 | 12/2012 | Der |
| 8,335,769 B2 | 12/2012 | Kesselman |
| 8,341,118 B2 | 12/2012 | Drobychev et al. |
| 8,351,290 B1 | 1/2013 | Huang et al. |
| 8,364,920 B1 | 1/2013 | Parkison et al. |
| 8,365,041 B2 | 1/2013 | Olbrich et al. |
| 8,375,146 B2 | 2/2013 | Sinclair |
| 8,397,016 B2 | 3/2013 | Talagala et al. |
| 8,402,152 B2 | 3/2013 | Duran |
| 8,412,880 B2 | 4/2013 | Leibowitz et al. |
| 8,423,739 B2 | 4/2013 | Ash et al. |
| 8,429,436 B2 | 4/2013 | Fillingim et al. |
| 8,452,928 B1 | 5/2013 | Ofer et al. |

(56) References Cited

U.S. PATENT DOCUMENTS

| | | | |
|---|---|---|---|
| 8,473,698 B2 | 6/2013 | Lionetti et al. |
| 8,473,778 B2 | 6/2013 | Simitci et al. |
| 8,473,815 B2 | 6/2013 | Chung et al. |
| 8,479,037 B1 | 7/2013 | Chatterjee et al. |
| 8,484,414 B2 | 7/2013 | Sugimoto et al. |
| 8,498,967 B1 | 7/2013 | Chatterjee et al. |
| 8,504,797 B2 | 8/2013 | Mimatsu |
| 8,522,073 B2 | 8/2013 | Cohen |
| 8,533,408 B1 | 9/2013 | Madnani et al. |
| 8,533,527 B2 | 9/2013 | Daikokuya et al. |
| 8,538,933 B1 * | 9/2013 | Hu ................... G06F 3/0641 |
| | | | 707/700 |
| 8,539,177 B1 | 9/2013 | Madnani et al. |
| 8,544,029 B2 | 9/2013 | Bakke et al. |
| 8,549,224 B1 | 10/2013 | Zeryck et al. |
| 8,583,861 B1 | 11/2013 | Ofer et al. |
| 8,589,625 B2 | 11/2013 | Colgrove et al. |
| 8,595,455 B2 | 11/2013 | Chatterjee et al. |
| 8,615,599 B1 | 12/2013 | Takefman et al. |
| 8,627,136 B2 | 1/2014 | Shankar et al. |
| 8,627,138 B1 | 1/2014 | Clark et al. |
| 8,639,669 B1 | 1/2014 | Douglis et al. |
| 8,639,863 B1 | 1/2014 | Kanapathippillai et al. |
| 8,640,000 B1 | 1/2014 | Cypher |
| 8,650,343 B1 | 2/2014 | Kanapathippillai et al. |
| 8,660,131 B2 | 2/2014 | Vermunt et al. |
| 8,661,218 B1 | 2/2014 | Piszczek et al. |
| 8,671,072 B1 | 3/2014 | Shah et al. |
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey, Jr. et al. |
| 8,719,621 B1 | 5/2014 | Karmarkar |
| 8,725,730 B2 | 5/2014 | Keeton et al. |
| 8,751,763 B1 * | 6/2014 | Ramarao ............. G06F 16/1752 |
| | | | 711/162 |
| 8,751,859 B2 | 6/2014 | Becker-Szendy et al. |
| 8,756,387 B2 | 6/2014 | Frost et al. |
| 8,762,793 B2 | 6/2014 | Grube et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar et al. |
| 8,824,261 B1 | 9/2014 | Miller et al. |
| 8,832,528 B2 | 9/2014 | Thatcher et al. |
| 8,838,541 B2 | 9/2014 | Camble et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Lazier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes et al. |
| 8,874,836 B1 | 10/2014 | Hayes et al. |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu et al. |
| 9,043,372 B2 | 5/2015 | Makkar et al. |
| 9,047,214 B1 | 6/2015 | Northcott |
| 9,053,808 B2 | 6/2015 | Sprouse et al. |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon et al. |
| 9,122,401 B2 | 9/2015 | Zaltsman et al. |
| 9,123,422 B2 | 9/2015 | Yu et al. |
| 9,124,300 B2 | 9/2015 | Sharon et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma et al. |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Sharon et al. |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido et al. |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Cai et al. |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Hayes et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |

(56) References Cited

U.S. PATENT DOCUMENTS

| | | |
|---|---|---|
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Haratsch et al. |
| 9,619,430 B2 | 4/2017 | Kannan et al. |
| 9,639,543 B2 * | 5/2017 | Li ................... G06F 16/11 |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,753,938 B2 | 9/2017 | Mallaiah et al. |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B1 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,846,718 B1 | 12/2017 | Ruef et al. |
| 9,891,854 B2 | 2/2018 | Munetoh et al. |
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,952,809 B2 | 4/2018 | Shah |
| 9,959,167 B1 | 5/2018 | Donlan et al. |
| 9,965,539 B2 | 5/2018 | D'Halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Yang et al. |
| 10,019,317 B2 | 7/2018 | Usvyatsky et al. |
| 10,031,703 B1 | 7/2018 | Natanzon et al. |
| 10,061,512 B2 | 8/2018 | Lin |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Yang |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Yang et al. |
| 10,162,704 B1 | 12/2018 | Kirschner et al. |
| 10,180,875 B2 | 1/2019 | Klein |
| 10,185,730 B2 | 1/2019 | Bestler et al. |
| 10,235,065 B1 | 3/2019 | Miller et al. |
| 10,324,639 B2 | 6/2019 | Seo |
| 10,496,490 B2 * | 12/2019 | Chandrasekharan ....................... G06F 16/1752 |
| 10,567,406 B2 | 2/2020 | Astigarraga et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0268905 A1 | 11/2007 | Baker et al. |
| 2008/0080709 A1 | 4/2008 | Michtchenko et al. |
| 2008/0107274 A1 | 5/2008 | Worthy |
| 2008/0155191 A1 | 6/2008 | Anderson et al. |
| 2008/0256141 A1 | 10/2008 | Wayda et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0268908 A1 | 10/2010 | Ouyang et al. |
| 2010/0306500 A1 | 12/2010 | Mimatsu |
| 2011/0035540 A1 | 2/2011 | Fitzgerald et al. |
| 2011/0040925 A1 | 2/2011 | Frost et al. |
| 2011/0060927 A1 | 3/2011 | Fillingim et al. |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0238635 A1 * | 9/2011 | Leppard ............... G06F 16/1752 707/693 |
| 2011/0264843 A1 | 10/2011 | Haines et al. |
| 2011/0302369 A1 | 12/2011 | Goto et al. |
| 2012/0011398 A1 | 1/2012 | Eckhardt et al. |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight et al. |
| 2012/0158923 A1 | 6/2012 | Mohamed et al. |
| 2012/0191670 A1 * | 7/2012 | Kennedy ............... G06F 16/1748 707/E17.005 |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0221525 A1 * | 8/2012 | Gold ................... G06F 11/1458 707/E17.001 |
| 2012/0226934 A1 | 9/2012 | Rao |
| 2012/0246435 A1 | 9/2012 | Meir et al. |
| 2012/0260055 A1 | 10/2012 | Murase |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats et al. |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healey, Jr. et al. |
| 2013/0151653 A1 | 6/2013 | Sawicki et al. |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0339314 A1 | 12/2013 | Carpentier et al. |

(56) References Cited

U.S. PATENT DOCUMENTS

| | | |
|---|---|---|
| 2013/0339635 A1 | 12/2013 | Amit et al. |
| 2013/0339818 A1 | 12/2013 | Baker et al. |
| 2014/0040535 A1 | 2/2014 | Lee et al. |
| 2014/0040702 A1 | 2/2014 | He et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0122818 A1* | 5/2014 | Hayasaka ............... G06F 3/067 711/162 |
| 2014/0136880 A1 | 5/2014 | Shankar et al. |
| 2014/0181402 A1 | 6/2014 | White |
| 2014/0188822 A1* | 7/2014 | Das ........................ H03M 7/30 707/693 |
| 2014/0220561 A1 | 8/2014 | Sukumar et al. |
| 2014/0237164 A1 | 8/2014 | Le et al. |
| 2014/0279936 A1 | 9/2014 | Bernbo et al. |
| 2014/0280025 A1 | 9/2014 | Eidson et al. |
| 2014/0289588 A1 | 9/2014 | Nagadomi et al. |
| 2014/0330785 A1 | 11/2014 | Isherwood et al. |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik et al. |
| 2015/0134824 A1 | 5/2015 | Mickens et al. |
| 2015/0142755 A1* | 5/2015 | Kishi .................... G06F 16/162 707/692 |
| 2015/0153800 A1 | 6/2015 | Lucas et al. |
| 2015/0154418 A1 | 6/2015 | Redberg |
| 2015/0180714 A1 | 6/2015 | Chunn et al. |
| 2015/0280959 A1 | 10/2015 | Vincent |
| 2016/0026397 A1 | 1/2016 | Nishikido et al. |
| 2016/0026653 A1* | 1/2016 | Caro ................... G06F 16/1752 707/692 |
| 2016/0182542 A1 | 6/2016 | Staniford |
| 2016/0191508 A1 | 6/2016 | Bestler et al. |
| 2016/0246537 A1 | 8/2016 | Kim |
| 2016/0248631 A1 | 8/2016 | Duchesneau |
| 2016/0378612 A1 | 12/2016 | Hipsh et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0177236 A1 | 6/2017 | Haratsch et al. |
| 2017/0262202 A1 | 9/2017 | Seo |
| 2018/0039442 A1 | 2/2018 | Shadrin et al. |
| 2018/0054454 A1 | 2/2018 | Astigarraga et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0157852 A1* | 6/2018 | Manville ............... G06F 16/137 |
| 2018/0217756 A1 | 8/2018 | Liu et al. |
| 2018/0307560 A1 | 10/2018 | Vishnumolakala et al. |
| 2018/0321874 A1 | 11/2018 | Li et al. |
| 2019/0036703 A1 | 1/2019 | Bestler |
| 2019/0220315 A1 | 7/2019 | Vallala et al. |
| 2020/0034560 A1 | 1/2020 | Natanzon et al. |
| 2020/0057752 A1* | 2/2020 | Tofano ..................... G06F 9/54 |
| 2020/0326871 A1 | 10/2020 | Wu et al. |
| 2021/0360833 A1 | 11/2021 | Alissa et al. |

FOREIGN PATENT DOCUMENTS

| | | |
|---|---|---|
| WO | 0213033 A1 | 2/2002 |
| WO | 2008103569 A1 | 8/2008 |
| WO | 2008157081 A2 | 12/2008 |
| WO | 2013032825 A2 | 3/2013 |

OTHER PUBLICATIONS

International Search Report and Written Opinion, PCT/US2015/018169, May 15, 2015, 10 pages.

International Search Report and Written Opinion, PCT/US2015/034291, Sep. 30, 2015, 3 pages.

International Search Report and Written Opinion, PCT/US2015/034302, Sep. 11, 2015, 10 pages.

International Search Report and Written Opinion, PCT/US2015/039135, Sep. 18, 2015, 8 pages.

International Search Report and Written Opinion, PCT/US2015/039136, Sep. 23, 2015, 7 pages.

International Search Report and Written Opinion, PCT/US2015/039137, Oct. 1, 2015, 8 pages.

International Search Report and Written Opinion, PCT/US2015/039142, Sep. 24, 2015, 3 pages.

International Search Report and Written Opinion, PCT/US2015/044370, Dec. 15, 2015, 3 pages.

International Search Report and Written Opinion, PCT/US2016/014356, Jun. 28, 2016, 3 pages.

International Search Report and Written Opinion, PCT/US2016/014357, Jun. 29, 2016, 3 pages.

International Search Report and Written Opinion, PCT/US2016/014361, May 30, 2016, 3 pages.

International Search Report and Written Opinion, PCT/US2016/014604, May 19, 2016, 3 pages.

International Search Report and Written Opinion, PCT/US2016/016504, Jul. 6, 2016, 7 pages.

International Search Report and Written Opinion, PCT/US2016/023485, Jul. 21, 2016, 13 pages.

International Search Report and Written Opinion, PCT/US2016/024391, Jul. 12, 2016, 11 pages.

International Search Report and Written Opinion, PCT/US2016/026529, Jul. 19, 2016, 9 pages.

International Search Report and Written Opinion, PCT/US2016/031039, Aug. 18, 2016, 7 pages.

International Search Report and Written Opinion, PCT/US2016/033306, Aug. 19, 2016, 11 pages.

International Search Report and Written Opinion, PCT/US2016/047808, Nov. 25, 2016, 14 pages.

Kim et al., "Data Access Frequency based Data Replication Method using Erasure Codes in Cloud Storage System", Journal of the Institute of Electronics and Information Engineers, Feb. 2014, vol. 51, No. 2, 7 pages.

Schmid, "RAID Scaling Charts, Part 3:4-128 KB Stripes Compared", Tom's Hardware, Nov. 27, 2007, URL: http://www.tomshardware.com/reviews/RAID-SCALING-CHARTS.1735-4.html, 24 pages.

Stalzer, "FlashBlades: System Architecture and Applications", Proceedings of the 2nd Workshop on Architectures and Systems for Big Data, Jun. 2012, pp. 10-14, Association for Computing Machinery, New York, NY.

Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

* cited by examiner

DEDUPLICATION SELECTION AND OPTIMIZATION

CROSS REFERENCE TO RELATED PATENTS

This is a continuation application for patent entitled to a filing date and claiming the benefit of earlier-filed U.S. Pat. No. 11,704,036, issued Jul. 18, 2023, which is a continuation of U.S. Pat. No. 10,133,503, filed Nov. 20, 2018, which is a non-provisional application of U.S. Provisional Application No. 62/330,728, filed May 2, 2016 each of which are herein incorporated by reference in their entirety.

TECHNICAL FIELD

The present disclosure is generally related to deduplication, and more particularly, to selecting a deduplication process based on a difference between performance metrics.

BACKGROUND

Data deduplication is a process to eliminate or remove redundant data to improve the utilization of storage resources. For example, during the deduplication process, blocks of data may be processed and stored. When a subsequent block of data is received, the subsequent block of data may be compared with the previously stored block of data. If the subsequent block of data matches with the previously stored block of data, then the subsequent block of data may not be stored in the storage resource. Instead, a pointer to the previously stored block of data may replace the contents of the subsequent block of data.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
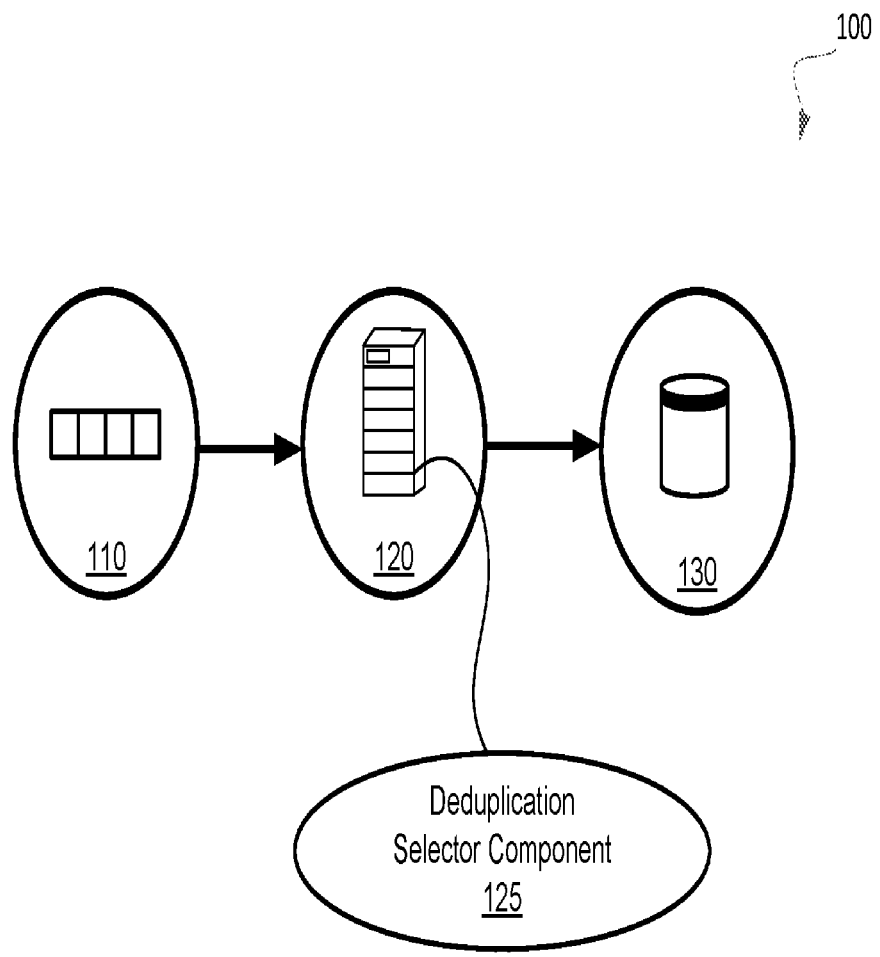
FIG. 1 illustrates an example environment to select a deduplication process based on a difference between performance metrics in accordance with some embodiments of the present disclosure.

Aspects of the present disclosure relate to selecting a deduplication process based on a difference between performance metrics. For example, data blocks may be analyzed by a deduplication process to determine whether a duplicate or copy of the data block is currently stored at a storage system. The deduplication process may use a hash function that generates a hash value based on the data block. The generated hash value may be compared with hash values of a deduplication map that identifies currently stored data blocks at the storage system. If the generated hash value matches with any of the hash values in the deduplication map, then the data block may be considered to be a copy or duplicate of another data block that is currently stored at the storage system. Alternatively, the deduplication process may directly compare the received data block with another data block that is currently stored at the storage system. Thus, the deduplication process may be based on comparing a generated hash value with a hash value retrieved from a deduplication map or based on comparing a received data block with a retrieved data block that has been previously stored at the storage system.

The storage system may use either deduplication process to determine whether copies of received data blocks are currently stored at the storage system. For example, a series (i.e., stream) of data blocks may be received to be stored at the storage system. A first hash value may be generated for one of the data blocks of the series of data blocks and the generated hash value may be compared with hash values in a deduplication map. If the first hash value matches with another hash value in the deduplication map, then the corresponding received data block of the series of data blocks may be considered a duplicate of another data block that is currently stored at the storage system.

Subsequently, a deduplication process may be used to determine whether the other data blocks of the series of data blocks are also duplicates of currently stored data blocks at the storage system. For example, the first deduplication process may be used to generate hash values for the other data blocks of the series and retrieve stored hash values associated with the other data blocks and currently stored in the deduplication map. The generated hash values may be compared with the retrieved hash values to determine whether the other data blocks of the series are duplicates of currently stored data blocks. Alternatively, the second deduplication process may be used to retrieve other stored data blocks that are associated with the stored data block and then compare the other received data blocks of the series with the other stored data blocks that have been retrieved to determine whether the other data blocks of the series are duplicates of the currently stored data blocks.

The first deduplication process and the second deduplication process may retrieve, respectively, the stored hash values and the other stored data blocks by retrieving the stored hash values and the stored data blocks from cache memory (i.e., a local memory) and a storage resource (i.e., a backing storage) at the storage system. For example, a subset of the hash values or data blocks may be retrieved from the cache memory and another subset may be retrieved from the storage resource. The retrieving of the hash values or data blocks from the cache memory may take less time than the retrieving of the hash values or data blocks from the storage resource. Thus, depending on the number of hash values to be retrieved that are that are stored at the cache memory as opposed to the storage resource and the number of data blocks to be retrieved that are stored at the cache memory as opposed to the storage resource, the performance of the first deduplication process and the second deduplication process may vary. For example, at certain times, the first deduplication process may be more efficient and take less time than the second deduplication process, and vice versa at other times. Thus, if a particular deduplication process is selected to be used by the storage system, a less efficient and time consuming deduplication process may be selected while a more efficient and less time consuming deduplication process may be available to the storage system.

Aspects of the present disclosure address the above and other deficiencies by determining or calculating performance metrics for the deduplication processes. For example, a first performance metric may be determined for the first deduplication process and a second performance metric may be determined for the second deduplication process. As described in further detail below, the performance metrics may be based on whether the respective data blocks or hash values are stored in cache memory, the storage resource, size of the data blocks that are to be retrieved, the number of data blocks that are to be retrieved, performance characteristics of the storage system, etc. If the first performance metric of the first deduplication process does not exceed the second performance metric of the second deduplication process (e.g., the first and second performance metrics predict less time for performing the first deduplication process as opposed to the second deduplication process) then the first deduplication process may be used to determine whether other data blocks of the series of data blocks received at the storage system are duplicates of currently stored data blocks at the storage system. Otherwise, if the second performance metric predicts that the second deduplication process may take less time to perform than the first performance metric, then the second deduplication process may be used to determine whether the other data blocks of the series of data blocks are duplicates of currently stored data blocks.

Thus, the present disclosure may improve the performance of a storage system by determining performance metrics for performing operations of deduplication processes. For example, the deduplication process that may perform a deduplication operation for data blocks faster than another deduplication process may be selected for use by the storage system when appropriate as based on the performance metrics.

FIG. 1 illustrates an example environment 100 to select a deduplication process based on a difference between performance metrics. In general, the environment 100 may include a storage server 120 that includes a deduplication selector component 125 that receives a stream or series of data blocks 110 for storing in a storage resource 130.

The deduplication process may be an inline data deduplication process where a data block is received and then analyzed before being stored in the storage resource 130. For example, the data deduplication process may determine whether copies of the data blocks 110 that are received are currently stored in the storage resource 130 (e.g., a solid-state non-volatile memory such as flash memory) before storing the received data blocks 110 in the storage resource 130. Thus, the inline data deduplication process may be performed as a stream of data blocks 110 are received to be stored in the storage resource 130.

In general, the deduplication process may receive a data block (e.g., of the series of data blocks) and perform a hash function with the data block to generate a hash value. The hash function may transform the data block of an arbitrary size to data of a fixed size corresponding to the hash value. The deduplication process may store the hash value for comparison with a subsequent data block. For example, when the subsequent data block is received, the hash function may be performed on the subsequent data block to generate a corresponding hash value based on the contents of the subsequent data block. If the corresponding hash value of the subsequent data block matches the previously stored hash value, then the contents of the subsequent data block may be a copy of the contents of the previously received data block. Instead of storing the contents of the subsequent data block, a pointer to the previously received data block with the matching hash value may be used to replace the contents of the subsequent data block.

As shown in FIG. 1, the deduplication selector component 125 may receive a series of data blocks 110. In some embodiments, the series of data blocks 110 may be a stream of data blocks that are to be stored at storage resources that are managed by a storage system (e.g., a flash storage array system or solid-state storage array) that includes the deduplication selector component 125. The deduplication selector component 125 may determine performance metrics for a first and second deduplication process and may select one of the deduplication processes with the received stream of data blocks 110 to determine whether the data blocks of the stream of data blocks 110 are duplicates of other data blocks currently stored at the storage resource 130. The deduplication process may be referred to as an inline deduplication process as the data blocks 110 are analyzed to determine whether a copy or duplicate is currently stored at the storage system before storing the data blocks 110.

Figure 2:
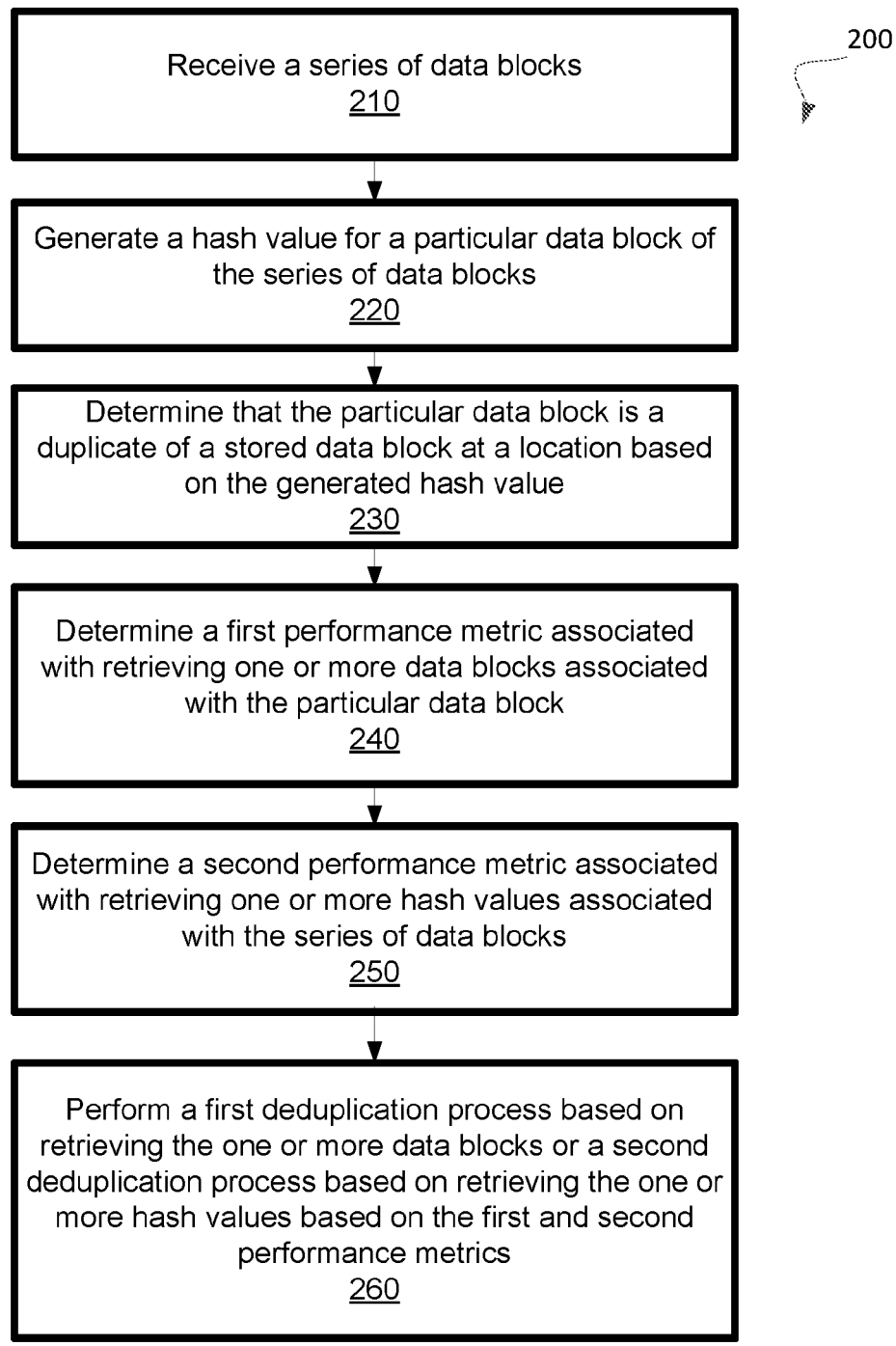
FIG. 2 illustrates an example method to select a deduplication process in accordance with some embodiments of the present disclosure.

As described in further detail with regard to FIG. 2, the deduplication selector component 125 may calculate a first performance metric for a first deduplication process and a second performance metric for a second deduplication process and compare the first and second performance metrics to determine which deduplication process to select to use for determining whether a copy of the series of data blocks 110 is currently stored in the storage resource 130. The deduplication selector component 125 may be implemented by a computer system or storage controller of a flash storage array system. In some embodiments, the deduplication selector component 125 may be implemented by processing logic that may include hardware (e.g., processing device, circuitry, dedicated logic, programmable logic, microcode, hardware of a device, integrated circuit, etc.), software (e.g., instructions run or executed on a processing device), or a combination thereof.

The storage resource 130 may correspond to non-disk storage media that is managed by or coupled with the deduplication selector component 125. For example, the storage resource 130 may be one or more solid-state drives (SSDs), flash memory based storage, any type of solid-state non-volatile memory, or any other type of non-mechanical storage device. In some embodiments, the storage resource 130 may be a storage device that includes a flash memory.

FIG. 2 illustrates an example method 200 to select a deduplication process. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 200.

As shown in FIG. 2, the method 200 may begin with the processing logic receiving a series of data blocks (block 210). For example, a group of data blocks may be received as part of a write operation provided to a storage system to store the group of data blocks at a storage resource that is managed by the storage system. Thus, multiple data blocks may be received and subjected to a deduplication process before any of the multiple data blocks are stored at the storage resource. The processing logic may further generate a hash value for a particular data block of the series of data blocks (block 220). For example, a hash function may be used to generate a hash value based on at least one of the data blocks of the series of data blocks. Thus, a subset of the received data blocks, or one data block of multiple data blocks, may be used to generate a first hash value. The processing logic may further determine that the particular data block is a duplicate of a stored data block at a location based on the generated hash value (block 230). For example, the generated hash value may be compared with hash values of a deduplication map that stores hash values for data blocks that are currently stored at the storage resource of the storage system. Further details with regard to the deduplication map are described in conjunction with FIG. 3.

The processing logic may determine a first performance metric associated with retrieving one or more data blocks associated with the particular data block (block 240). The first performance metric may be based on retrieving data blocks that are proximate (e.g., logically proximate in a logical space or physically proximate at the storage resource) to the particular data block at the location at the storage resource of the storage system that is identified by the generated hash value. For example, the data blocks may be in a particular range of data blocks that includes the particular data block or is around the particular data block. The retrieving of the data blocks may be based on retrieving the data blocks from a cache memory of the storage system and/or from a storage resource of the storage system. For example, the data blocks may be retrieved from the cache memory instead of the storage resource when the respective data blocks are currently stored at the cache memory. Thus, the first performance metric may be based on whether data blocks that are to be retrieved are currently stored at the cache memory or the storage resource. The first performance metric may indicate a better performance (e.g., less time to perform a first deduplication process) when more data blocks to be retrieved are currently stored at the cache memory. Further details with regards to determining a performance metric are described in conjunction with FIGS. 5A and 5B.

Furthermore, the processing logic may determine a second performance metric associated with retrieving one or more hash values associated with the series of data blocks (block 250). The second performance metric may be based on retrieving hash values that are stored in a deduplication map and generating hash values for the other data blocks of the series of data blocks. Furthermore, the second performance metric may similarly indicate a better performance (e.g., less time to perform a second deduplication process) when more hash values of the deduplication map that are to be retrieved are currently stored at the cache memory instead of the storage resource.

Referring to FIG. 2, the processing logic may subsequently perform a first deduplication process based on retrieving the one or more data blocks or a second deduplication process based on retrieving the one or more hash values based on the first and second performance metrics (block 260). For example, the first deduplication process may be selected to be performed to perform the deduplication process with the other data blocks of the series of data blocks when the first performance metric indicates that the first deduplication process may be more efficient (e.g., take less time to perform) than the second deduplication process. The first performance metric may indicate a first amount of time to perform the first deduplication process and the second performance metric may indicate a second amount of time to perform the second deduplication process. The deduplication process that is associated with a lesser amount of time to perform the respective deduplication process may be selected to be performed.

Figure 3:
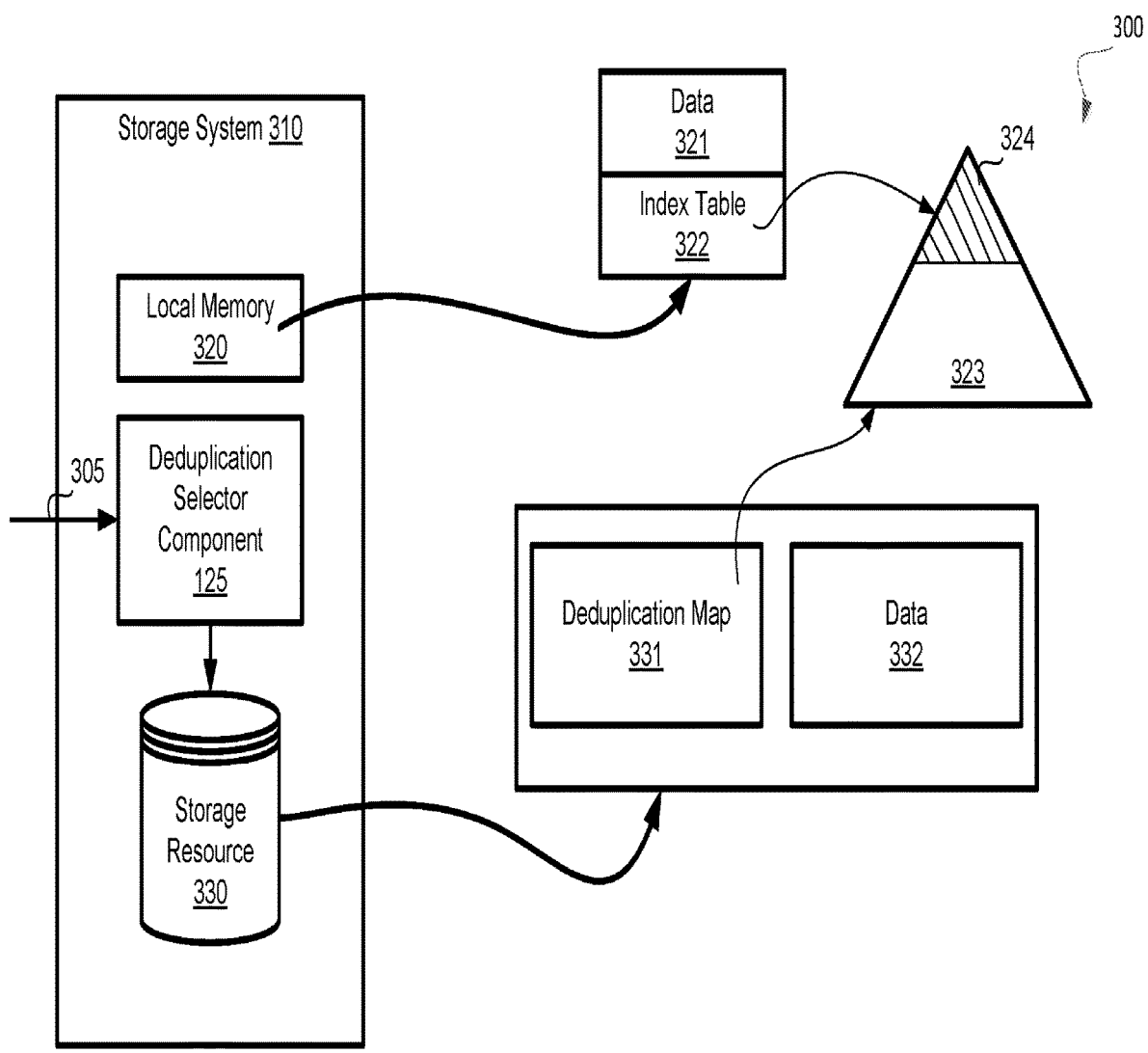
FIG. 3 is an example environment 100 with a storage system that is associated with a local memory and a storage resource for storing data blocks and hash values of a deduplication map in accordance with some embodiments.

FIG. 3 illustrates an example environment 300 with a storage system that is associated with a local memory and a storage resource for storing data blocks and hash values of a deduplication map. In general, the environment 300 may include a storage system 310 with the deduplication selector component 125 of FIG. 1.

As shown in FIG. 3, the storage system 310 may include a cache memory or local memory 320 (e.g., DRAM) and a backing storage or storage resource 330 (e.g., a solid-state non-volatile memory such as flash memory). The storage system 310 may be a solid-state storage array system such as, but not limited to, a flash storage array system. The local memory 320 may store a portion of hash values in an index table 322 and a portion of data 321 and the storage resource 330 may store a deduplication map 331 and data 332. In general, the storage system 310 may receive data blocks 305 and store the data blocks in the storage resource 330 after the deduplication selector component 125 selects a deduplication process to be performed on the received data blocks. The deduplication process may be selected based on hash values that are stored at the portion of hash values in an index table 322 at the local memory 320 and the deduplication map 331 at the storage resource 330 as well as the data blocks at the portion of data 321 stored at the local memory 320 and the data blocks at the data 332 stored at the storage resource 330. The portion of hash values in the index table 322 may be a subset or a portion of the hash values recorded in the deduplication map 331. For example, the portion of hash values in the index table 322 may be hash values that have been recently generated by the storage system 310 for prior received data blocks and are currently stored in the local memory (i.e., the cache) of the storage system 310. Furthermore, the portion of data 321 may correspond to a subset or portion of data blocks that are stored at the data 332. For example, the portion of data 321 may be data blocks that have been recently received by the storage system for storage at the storage resource 330.

In operation, a series of data blocks 305 may be received by the deduplication selector component 125 of the storage system 310 to be stored at the storage resource 330. In response to receiving the data blocks 305, a deduplication process may be selected by the deduplication selector component 125 as described in conjunction with FIG. 2 and FIGS. 4-5B. The selected deduplication process may be used to determine whether a copy of the data block from the data blocks 305 has already been stored at the storage resource 330. For example, the data block may either be compared with another data block received from the local memory 320 or the storage resource 330 or a hash value may be generated for the data block and a hash value may be retrieved from the deduplication map 331 or the local memory 320 and the generated hash value may be compared with the retrieved hash value. If the comparison of data blocks results in the received data block matching the retrieved data block or if the generated hash value matches with the retrieved hash value, then the data block may be considered a duplicate of the data block stored at the storage resource 330. Instead of storing the contents of the received data block, the data block may be stored at the storage resource 330 by creating a pointer to a physical location of the copy of the data block at the storage resource 330. Otherwise, if the data block is not considered a duplicate of another data block stored at the storage resource 330, then the data block may be stored in the storage resource 330 and an entry of the deduplication map 331 may be modified to register the data block by including a hash value of the data block and the physical location in the storage resource 330 where the data block has been stored in an entry.

Although aspects of the present disclosure relate to inline data deduplication, the disclosure herein may be applied to post-processing data deduplication that may be used to analyze data blocks currently stored on the storage resource 330. For example, the post-processing deduplication may analyze each data block that is currently stored on the storage resource 330 to determine whether the corresponding data block is a copy or duplicate of another data block currently stored on the storage resource 330.

Thus, data blocks and hash values may be stored in a local memory and a storage resource. A deduplication process may be selected based on a distribution of the data blocks and hash values in the local memory and the storage resource.

Figure 4:
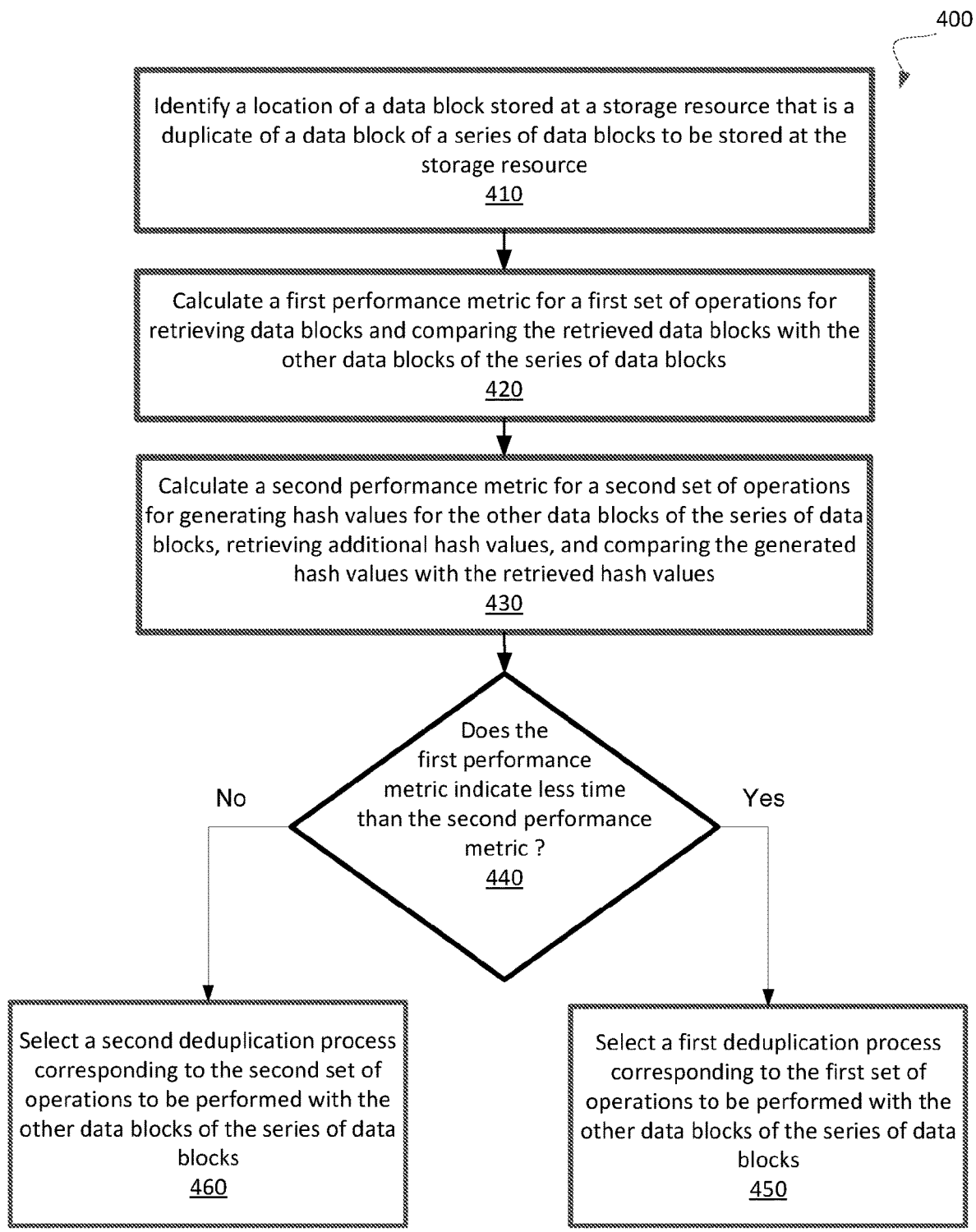
FIG. 4 is an example method to select a first deduplication process based on retrieving data blocks or a second deduplication process based on retrieving hash values in accordance with some embodiments.

FIG. 4 is an example method 400 to select a first deduplication process based on retrieving data blocks or a second deduplication process based on retrieving hash values. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 400.

As shown in FIG. 4, the method 400 may begin with the processing logic identifying a location of a data block stored at a storage resource that is a duplicate of a data block of a series of data blocks (block 410). For example, the series of data blocks may be received to be stored at the storage resource and at least one of the data blocks may be determined to be a duplicate of another data block currently stored at the storage resource. The location may be determined by using a hash value of the data block as previously described. The processing logic may further calculate a first performance metric for a first set of operations for retrieving data blocks and comparing the retrieved data blocks with the other data blocks of the series of data blocks (block 420). The first set of operations may correspond to the first deduplication process. The retrieved data blocks may correspond to data blocks that are proximate to the data block that is a duplicate. In some embodiments, the retrieved data blocks may correspond to data blocks that are proximate in logical space to the data block that is a duplicate. In the same or alternative embodiments, the retrieved data blocks may correspond to data blocks that are physically proximate in the storage resource to the data block that is a duplicate. For example, the data blocks may be retrieved from the storage resource or may be retrieved from a cache memory. In some embodiments, when the data blocks are stored at both the cache memory and the storage resource, the data blocks may be retrieved from the cache memory instead of the storage resource. The processing logic may further calculate a second performance metric for a second set of operations for generating hash values for the other data blocks of the series of data blocks, retrieving additional hash values, and comparing the generated hash values with the retrieved hash values (block 430). The second set of operations may correspond to the second deduplication process. The retrieved hash values may correspond to hash values for the data blocks that are proximate to the data block that is a duplicate. The hash values may be retrieved from the cache memory when the respective hash values are present in the local memory and the hash values may be retrieved from the storage resource when the respective hash values are not present in the local memory.

Referring to FIG. 4, the processing logic may further determine whether the first performance metric indicates less time than the second performance metric (block 440). If the first performance metric indicates that the first set of operations may be performed in less than time than the second set of operations, then the processing logic may select the first deduplication process corresponding to the first set of operations to be performed with the other data blocks of the series of data blocks (block 450). For example, the first deduplication process may be used to determine whether the other data blocks are duplicates of data blocks stored at the storage resource. Otherwise, if the second performance metric indicates that the second set of operations may be performed in less time than the first set of operations, then the processing logic may select the second deduplication process corresponding to the second set of operations to be performed with the other data blocks of the series of data blocks (block 460). For example, the second deduplication process may be used to determine whether the other data blocks are duplicates of data blocks currently stored at the storage system.

Figure 5A:
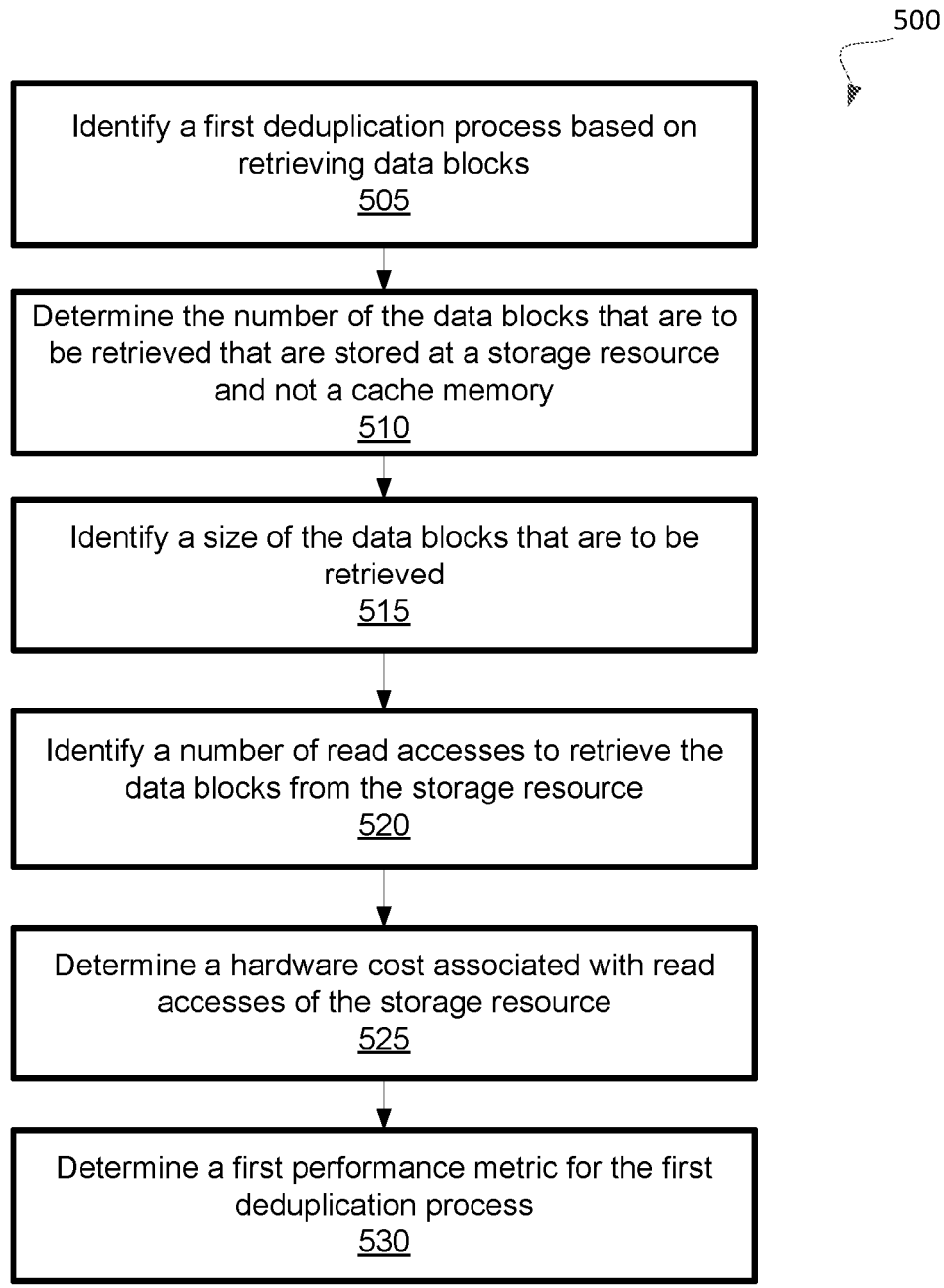
FIG. 5A is an example method to determine a first performance metric for a first deduplication process in accordance with some embodiments of the present disclosure.

FIG. 5A is an example method 500 to determine a first performance metric for a first deduplication process. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 500.

As shown in FIG. 5A, the method 500 may begin with the processing logic identifying a first deduplication process based on retrieving data blocks (block 505). The first deduplication process may be a deduplication process that is available for a storage system that has received a plurality of data blocks to be stored at a storage resource. For example, the first deduplication process may determine whether the received data blocks are duplicates of currently stored data blocks by comparing the received data blocks with the currently stored data blocks after retrieval. The processing logic may subsequently determine the number of the data blocks that are to be retrieved that are stored at a storage resource and not a cache memory (block 510). The processing logic may further identify a size of the data blocks that are to be retrieved (block 515). For example, the size of the data blocks that are to be retrieved from the storage resource may be identified. The processing logic may further identify a number of read accesses to retrieve the data blocks that are to be retrieved from the storage resource (block 520). For example, the data blocks may be stored at various locations within the storage resource and a number of read accesses of the storage resource to retrieve each of the data blocks that are to be retrieved from the storage resource may be identified. Furthermore, the processing logic may determine a hardware cost associated with the read accesses of the storage resource (block 525). The cost may be associated with a network bandwidth and a processing usage to retrieve the data blocks from the storage resource.

Subsequently, the processing logic may determine the first performance metric for the first deduplication process based on the number of data blocks that are to be retrieved from the storage resource, the size of the data blocks, the number of read accesses, and the hardware cost (block 530). In some embodiments, the first performance metric may indicate a longer amount of time to perform the first deduplication process when the number of data blocks to be retrieved from the storage increases, the size of the data blocks increases, the number of read accesses increases, and when the hardware cost corresponds to an increase in network bandwidth and processing usage.

Figure 5B:
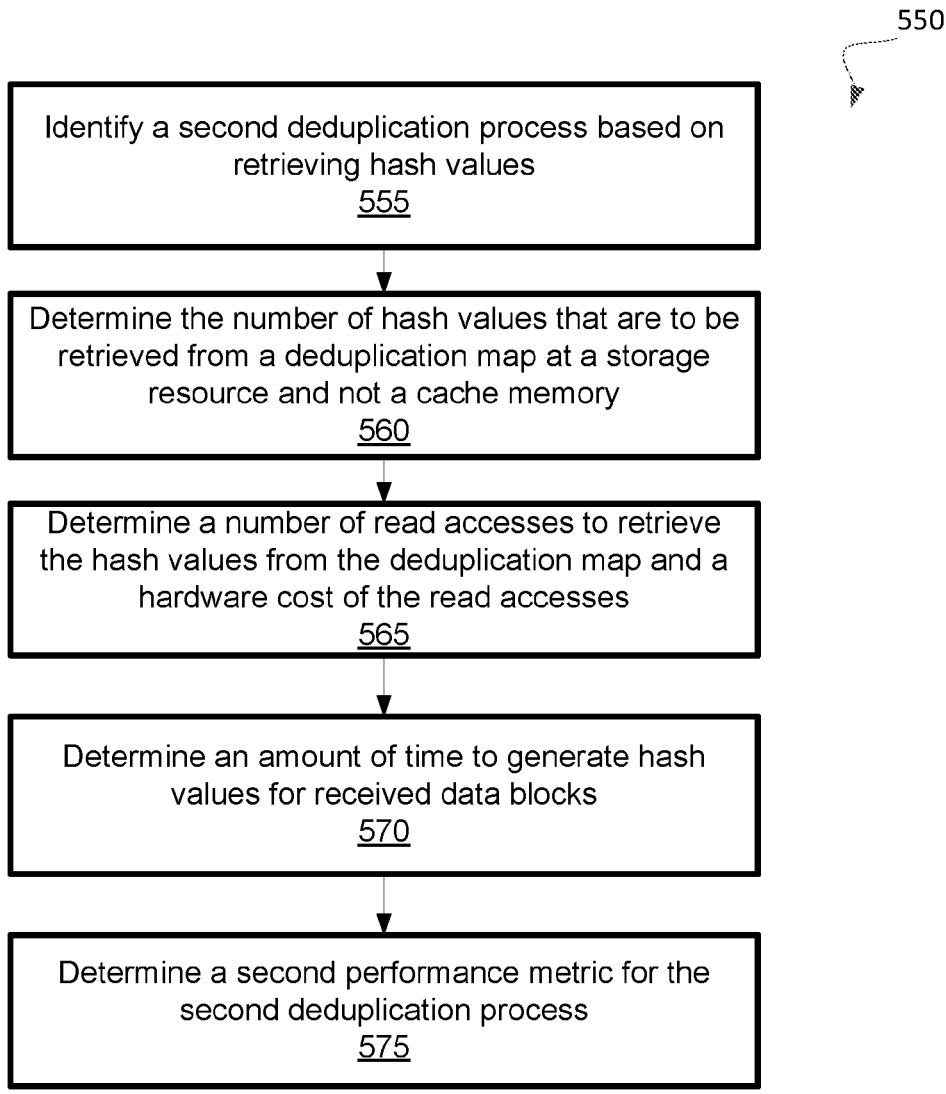
FIG. 5B is an example method to determine a second performance metric for a second deduplication process in accordance with some embodiments of the present disclosure.

FIG. 5B is an example method 550 to determine a second performance metric for a second deduplication process. In general, the method 550 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the deduplication selector component 125 of FIG. 1 may perform the method 550.

As shown in FIG. 5B, the method 550 may begin with the processing logic identifying a second deduplication process based on retrieving hash values (block 555). The processing logic may subsequently identify a number of hash values that are to be retrieved from a deduplication map at a storage resource and not a cache memory (block 560). The processing logic may further determine a number read accesses to retrieve the hash values from the deduplication map at the storage resource, a cost of the read accesses, and a hardware cost associated with the read accesses (block 565). Furthermore, the processing logic may determine an amount of time to generate hash values for received data blocks (block 570). For example, an amount of time to generate the hash values for received data blocks by a hash function may be received.

Subsequently, the processing logic may determine the second performance metric for the second deduplication process based on the number of hash values that are to be retrieved from deduplication map at the storage resource, the number of read accesses, the hardware cost, and the amount of time to generate the hash values (block 575). In some embodiments, the second performance metric may indicate a longer amount of time to perform the second deduplication process when the number of hash values to be retrieved from the storage increases, the number of read accesses increases, when the hardware cost corresponds to an increase in network bandwidth and processing usage, and when the amount of time to generate the hash values increases.

Figure 6:
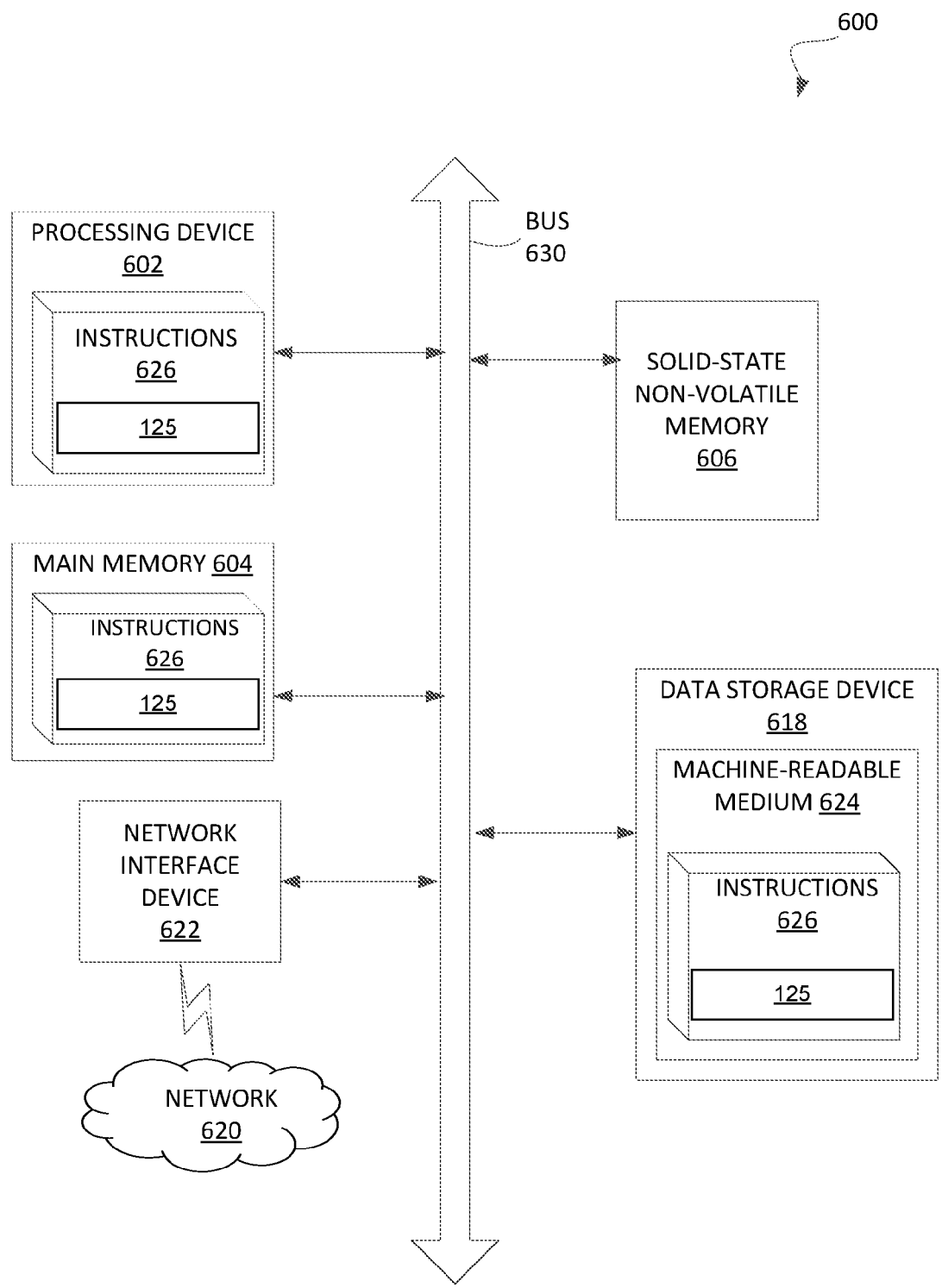
FIG. 6 is a block diagram of an example computer system operating in accordance with the disclosure described herein.

FIG. 6 depicts an example computer system 600 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, a storage system, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a solid-state non-volatile memory 606 (e.g., flash memory, 3D crosspoint (XPoint) memory, magnetoresistive random-access memory (MRAM), or any other such storage media that does not use a physical disk), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the deduplication selector component 125 of FIG. 1 for performing the operations and steps discussed herein. The computer system 600 may further include a network interface device 622. The data storage device 616 may include a computer-readable medium 624 on which is stored the deduplication selector component 125 embodying any one or more of the methodologies or functions described herein. The deduplication selector component 125 may also reside, completely or at least partially, within the main memory 604 and/or within the processing device 602 during execution thereof by the computer system 600, the main memory 604 and the processing device 602 also constituting computer-readable media. The deduplication selector component 125 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "performing," "using," "registering," "recording," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A storage system comprising:
   a plurality of storage devices comprising flash memory; and
   a processing device, operatively coupled to the plurality of storage devices, configured to:
   generate a hash value for a portion of data blocks to be stored at a particular storage device of the plurality of storage devices;
   determine that the hash value matches a corresponding hash value of a data block currently stored at the particular storage device;
   select one of a first deduplication process or a second deduplication process to be performed by the processing device based on one or more performance metrics, the one or more performance metrics comprise a type of storage medium the other data blocks are retrieved from, wherein the selected one of the first deduplication process or the second deduplication process determines whether remaining portions of the data blocks to be stored at the particular storage device match other data blocks currently stored at the particular storage device, and wherein when performing the second deduplication process, the processing device is further configured to:
   retrieve the other data blocks currently stored at the particular storage device that are associated with the data block currently stored at the particular storage device; and
   determine whether one or more of the remaining portions of the data blocks to be stored at the particular storage device match the other data blocks; and
   perform, by the processing device, the selected one of the first deduplication process or the second deduplication process.

2. The storage system of claim 1, wherein to perform the first deduplication process, the processing device is further configured to:
generate hash values for one or more remaining portions of the data blocks to be stored at the particular storage device; and
determine whether one or more of the hash values for the one or more remaining portions of the data blocks match one or more corresponding hash values of the other data blocks currently stored at the particular storage device.

3. The storage system of claim 1, wherein the other data blocks are physically proximate to the data block currently stored at the particular storage device.

4. The storage system of claim 1, wherein the one or more performance metrics comprise corresponding amounts of overhead to complete the first deduplication process and the second deduplication process.

5. The method of claim 1, wherein the processing device offloads management of the flash memory from a controller of the storage device.

6. A method comprising:
generating a hash value for a portion of data blocks to be stored at a storage device comprising flash memory;
determining that the hash value matches a corresponding hash value of a data block currently stored at the storage device;
selecting, by a processing device, one of a first deduplication process or a second deduplication process to be performed by the processing device based on one or more performance metrics, the one or more performance metrics comprise a type of storage medium the other data blocks are retrieved from, wherein the selected one of the first deduplication process or the second deduplication process determines whether remaining portions of the data blocks to be stored at the storage device match other data blocks currently stored at the storage device, and wherein when performing the second deduplication process, the processing device is further configured to;
retrieving the other data blocks currently stored at the storage device that are associated with the data block currently stored at the storage device; and
determining whether one or more of the remaining portions of the data blocks to be stored at the storage device match the other data blocks; and
performing, by the processing device, the selected one of the first deduplication process or the second deduplication process.

7. The method of claim 6, wherein performing the first deduplication process comprises:
generating hash values for one or more remaining portions of the data blocks to be stored at the storage device; and
determining whether one or more of the hash values for the one or more remaining portions of the data blocks match one or more corresponding hash values of the other data blocks currently stored at the storage device.

8. The method of claim 6, wherein the other data blocks are physically proximate to the data block currently stored at the storage device.

9. The method of claim 6, wherein the one or more performance metrics comprise corresponding amounts of overhead to complete the first deduplication process and the second deduplication process.

10. The method of claim 6 wherein the processing device is external to the storage device.

11. A non-transitory computer-readable storage medium storing instructions which, when executed by a processing device, cause the processing device to:
generate a hash value for a portion of data blocks to be stored at a storage device comprising flash memory;
determine that the hash value matches a corresponding hash value of a data block currently stored at the storage device;
select one of a first deduplication process or a second deduplication process to be performed by the processing device based on one or more performance metrics, the one or more performance metrics comprise a type of storage medium the other data blocks are retrieved from, wherein the selected one of the first deduplication process or the second deduplication process determines whether remaining portions of the data blocks to be stored at the storage device match other data blocks currently stored at the storage device;
retrieve the other data blocks currently stored at the storage device that are associated with the data block currently stored at the storage device; and
determine whether one or more of the remaining portions of the data blocks to be stored at the storage device match the other data blocks; and
perform, by the processing device, the selected one of the first deduplication process or the second deduplication process.

12. The non-transitory computer-readable storage medium of claim 11,
wherein to perform the first deduplication process, the processing device is further configured to:
generate hash values for one or more remaining portions of the data blocks to be stored at the storage device; and
determine whether one or more of the hash values for the one or more remaining portions of the data blocks match one or more corresponding hash values of the other data blocks currently stored at the storage device.

13. The non-transitory computer-readable storage medium of claim 11, wherein the other data blocks are physically proximate to the data block currently stored at the storage device.

14. The non-transitory computer-readable storage medium of claim 11, wherein the one or more performance metrics comprise corresponding amounts of overhead to complete the first deduplication process and the second deduplication process.

15. The non-transitory computer-readable storage medium of claim 11, wherein the processing device offloads management of the flash memory from a controller of the storage device.

* * * * *